(No Model.)

M. J. ROURK.
ROAD CART.

No. 441,444. Patented Nov. 25, 1890.

WITNESSES
B. D. Wheeler
C. D. Wheeler

INVENTOR
M. J. Rourk
by
Ranson B. Wheeler
Attorney.

THE NORRIS PETERS CO., PHOTO-LITHO., WASHINGTON, D. C.

UNITED STATES PATENT OFFICE.

MATTHEW J. ROURK, OF LAPEER, MICHIGAN.

ROAD-CART.

SPECIFICATION forming part of Letters Patent No. 441,444, dated November 25, 1890.

Application filed April 5, 1890. Serial No. 346,771. (No model.)

*To all whom it may concern:*

Be it known that I, MATTHEW J. ROURK, a citizen of the United States, residing at Lapeer, in the county of Lapeer and State of Michigan, have invented certain new and useful Improvements in Road-Carts; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in vehicles, and especially to that class known as "road-carts;" and it consists in a certain construction and arrangement of parts, producing a substantial, economic, and easy-riding cart, in which the seat and supporting-spring are located directly over the vertical center of the axle, the ends of the spring being suspended from link-couplings secured in brackets that are mounted on the upper face of the axle, permitting a free elongation of the spring. The vehicle-body is pivotally coupled at the forward end to the cross-bar of the thills, and is adjustable vertically both at its rear and forward end, whereby the seat may retain the same horizontal plane with either a light or heavy person, and a further arrangement of parts permitting the attaching and employment of ordinary buggy-thills, all of which will be hereinafter more fully set forth, and the essential features of the device pointed out particularly in the claims.

Figure 1:
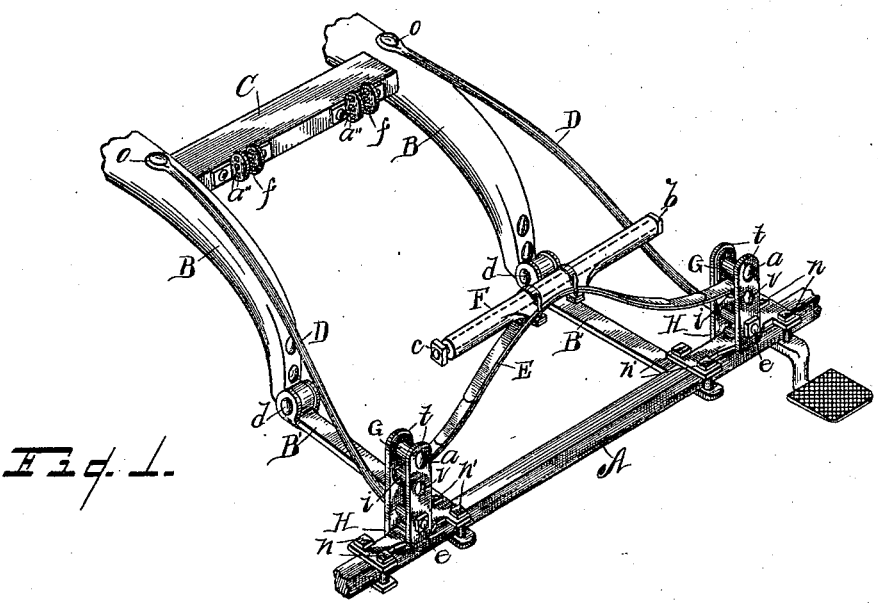
Figure 2:
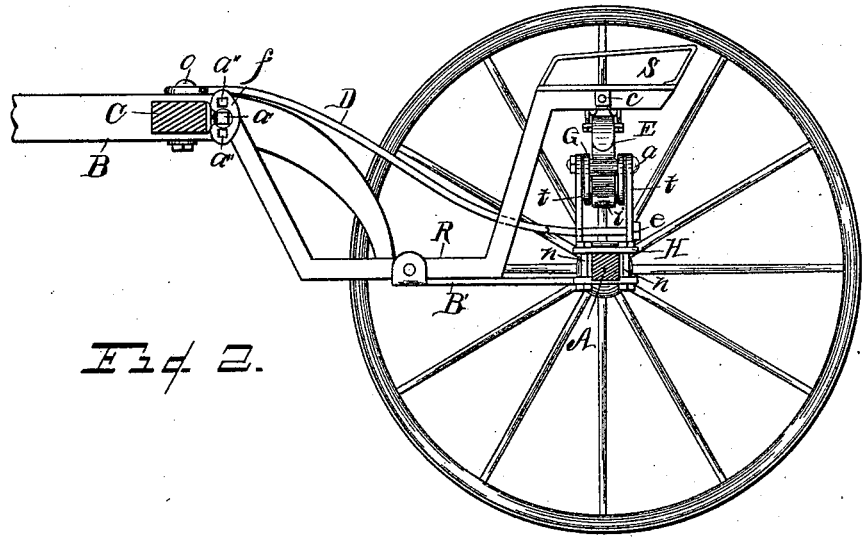

In the accompanying drawings, forming a part of the specification, Figure 1 is a perspective view of the parts of a vehicle embodying my invention, wherein the body and seat are removed. Fig. 2 is a side view of the vehicle, showing the body and seat in position and having one wheel and a portion of the thills broken away.

Referring to the letters of reference, A indicates the axle; B B, the thills, and C the cross-bar thereof.

D D indicate the brace-rods; E, the spring, and F the cross-head mounted on said spring and pivotally supporting the rear of the vehicle-body, as shown in Fig. 2.

The rear ends of the thills B B are coupled, as shown at $d$, to the forward ends of the extension-irons B' B', the rear ends of said irons being coupled to the axle.

The brackets H H are mounted on the upper face of the axle A, near each end thereof, and are secured thereto by the bolts $n\ n'$, as shown. The forward ends of the brace-rods D D are secured to the upper face of the thills. The rear ends of said rods are bent downward and passed through the lower ends of the uprights $t\ t$ of the brackets H H, and are secured by the nuts $e\ e$. The link G is pivoted between the upper ends of the uprights $t\ t$ of the brackets H H by means of the bolt $a$, the depending end of said link being pivotally coupled to the end of the spring E, as shown at $i$, whereby when a weight is put upon the spring the links G will oscillate, thus permitting a free elongation of said spring and a lateral motion to the rear portion of the body.

The cross-head F is mounted on the spring E and is provided with the bolt $b$, passing longitudinally therethrough. The rear portion of the body R, carrying the seat S, is pivotally secured to the cross-head F by means of the bolt $b$, which passes through said body and the cross-head and is secured by the nut $c$, as shown in Fig. 2, and by means of the series of holes $v$ in the uprights $t\ t$ of the brackets H the links G may be raised and lowered between said uprights, thus permitting a vertical adjustment of the rear portion of the vehicle-body and the seat.

The forward end of the body R is pivoted (by means of the bolts $a'$) in the heads $f\ f$, that are secured to the cross-bar C of the thills, and by means of the series of holes $a''$ in said heads the forward end of the body R is adapted to be adjusted vertically.

It will now be apparent that by the construction and arrangement of parts as shown and described a road-cart is produced that is easy of access, obviating the necessity of climbing over the thills to attain the seat, and in which the body may be adjusted vertically both at its front and rear end, as desired, that affords a free and easy motion to the vehicle-seat and supports the seat on a spring directly over the vertical center of the axle. The pivotal connection of the body-frame to the head-block of the spring permits the vertical adjustment of the body at the front and rear end without in any manner affecting the operation or relative positions of the other parts of the running-gear.

Having thus fully set forth my invention, what I claim as new, and desire to secure by Letters Patent, is—

1. In combination with the axle and brackets mounted thereon, the extension-irons, the thills attached to the extension-irons, the brace-rods coupling the thills to the brackets, the links adjustably coupled to the brackets, and the spring pivotally coupled to said links, as set forth.

2. In combination with the thills, extension-irons, axle, brace-rods, and brackets mounted on the axle, the spring adjustably coupled to the brackets, the head-block on said spring, the bolt passing through the head-block, the body pivotally mounted on the bolt of the head-block, said body having its forward end attached to the thills, substantially as specified.

3. In combination with the axle, the brace-rods mounted thereon, the thills, and means for coupling the thills with the axle and its brackets, the spring adjustably coupled to the brackets, the head-block on said spring, the body pivotally mounted on the head-block and having a vertical adjustment with the thills, substantially as and for the purposes specified.

In testimony whereof I affix my signature in presence of two witnesses.

MATTHEW J. ROURK.

Witnesses:
FRED. S. WHEAT,
JOSEPH WALTERS.